(12) United States Patent
Poirier (10) Patent No.: US 7,047,192 B2
(45) Date of Patent: May 16, 2006

(54) SIMULTANEOUS MULTI-USER REAL-TIME SPEECH RECOGNITION SYSTEM

(76) Inventor: Darrell A. Poirier, 148 Old Turnpike Rd., Quinebaug, CT (US) 06262-0508

(*) Notice: Subject to any disclaimer, the term of this patent is extended or adjusted under 35 U.S.C. 154(b) by 293 days.

(21) Appl. No.: 09/893,171

(22) Filed: Jun. 27, 2001

(65) Prior Publication Data

US 2002/0049589 A1    Apr. 25, 2002

Related U.S. Application Data

(60) Provisional application No. 60/214,504, filed on Jun. 28, 2000.

(51) Int. Cl.
*G10L 15/26* (2006.01)

(52) U.S. Cl. .............. 704/235; 704/276; 704/270; 704/500; 704/270.1

(58) Field of Classification Search .......... 704/231, 704/270, 235, 270.1, 278, 251, 276; 714/44, 714/47; 361/685, 709

See application file for complete search history.

(56) References Cited

U.S. PATENT DOCUMENTS

| | | | |
|---|---|---|---|
| 5,586,250 A * | 12/1996 | Carbonneau et al. | 714/44 |
| 5,644,707 A * | 7/1997 | Chen | 714/47 |
| 5,721,827 A * | 2/1998 | Logan et al. | 709/217 |
| 5,930,752 A * | 7/1999 | Kawaguchi et al. | 704/270.1 |
| 5,960,063 A | 9/1999 | Kuroiwa et al. | |
| 6,014,624 A | 1/2000 | Raman | |
| 6,049,973 A * | 4/2000 | Frank et al. | 361/709 |
| 6,064,963 A | 5/2000 | Gainsboro | |
| 6,067,516 A | 5/2000 | Levay et al. | |
| 6,100,882 A * | 8/2000 | Sharman et al. | 704/235 |
| 6,108,628 A | 8/2000 | Komori et al. | |
| 6,199,076 B1 * | 3/2001 | Logan et al. | 715/501.1 |
| 6,260,011 B1 | 7/2001 | Heckerman et al. | |
| 6,271,604 B1 * | 8/2001 | Frank et al. | 361/685 |
| 6,332,122 B1 * | 12/2001 | Ortega et al. | 704/270 |
| 6,359,779 B1 * | 3/2002 | Frank et al. | 361/685 |
| 6,360,237 B1 | 3/2002 | Schulz et al. | |
| 6,374,225 B1 * | 4/2002 | Hejna, Jr. | 704/270 |
| 6,389,499 B1 * | 5/2002 | Frank et al. | 361/686 |
| 6,477,491 B1 * | 11/2002 | Chandler et al. | 704/235 |
| 6,792,409 B1 * | 9/2004 | Wutte | 704/276 |
| 6,816,834 B1 | 11/2004 | Jaroker | |
| 6,820,055 B1 * | 11/2004 | Saindon et al. | 704/235 |

FOREIGN PATENT DOCUMENTS

| | | | |
|---|---|---|---|
| FR | EP001168303 A1 * | 6/2000 | |
| GB | EP000952737 A2 * | 10/1999 | |
| JP | 2001-065383 | * | 3/2001 |

* cited by examiner

*Primary Examiner*—Vijay Chawan
(74) *Attorney, Agent, or Firm*—Blodgett & Blodgett, P.C.

(57) ABSTRACT

This invention is a combination of software and hardware components and methodologies that enable speech recognition for multiple users simultaneously. It introduces the concept of a "conversational voice log" and how voice logs are combined to represent the spoken words of a meeting or group conversations. It defines the components needed, command set for control, text output features, and usage of such a system.

2 Claims, 5 Drawing Sheets

Functional Diagram of CTTS

Functional Diagram of CTTS

Single User Section Functional Diagram of CTTS

Micro-Computer Packaged Into Standard 5 1/4" Form Factor

SIMULTANEOUS MULTI-USER REAL-TIME SPEECH RECOGNITION SYSTEM

CROSS-REFERENCE TO RELATED APPLICATIONS

This application claims the benefit under 35 U.S.C. 119(e) of U.S. Provisional Application No. 60/214,504 filed on Jun. 28, 2000.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

1. Field of the Invention

This writing explains a method to solve the problems in generating a Multi User Conversational Voice Log or (MVL). In this document, the term speech recognition shall be used to denote conversion of spoken words to text. The term voice recognition will be used to denote identifying a person from the person's voice. Otherwise, however, the term voice shall be used to denote the actual sound a person makes when speaking or an accurate recording of that sound, unless another meaning is clear from the context. There are many problems and sub problems that need to be solved in order to create a MVL. These include:
Real-time speech recognition and capture of many people
Distinguishing each person in a group individually
Creating the individual voice log
Integration of each person's voice log into a combined MVL
Organization of the many voice logs in the proper order
Acceptable accuracy to make the log useful
Making the text log easily accessible or printable on request
Having a command set that can address the control of creating a MVL 2. Description of the Prior Art The Problem Consider a meeting with several people in a conference room. Typically, capturing the history of the meeting is handwritten notes or minutes being taken and converted into text by a human. This requires either a non-participant of the meeting to capture notes, or a person engaged in the meeting to be the note taker and provide output. In either case, it is a burden to some person. If multiple languages are needed, people with additional skills must be used.

These and other difficulties experienced with the prior art devices have been obviated in a novel manner by the present invention.

It is, therefore, an outstanding object of the present invention to provide an effective way to create a textual representation of the discussion by multiple speakers.

It is a further object of the invention to provide a Simultaneous Multi-User Real-time Speech Recognition System and text creator that is capable of being manufactured of high quality and at a low cost, and which is capable of providing a long and useful life with a minimum of maintenance. With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

A New Method for Capturing History of a Meeting or Group of People

A method of fixing the problem would be to use a Conference To Text System (CTTS)

Using speech recognition in the meeting environment combined with the ability to capture every person's conversation individually, including all people in total, allows minutes to be captured real-time and converted to the format of text. Thus creating a Multi-User Conversational Voice Log or "MVL". This concept can be used in many applications spanning from a single person's conversation to a meeting of the United States House of Representatives, and everything in between. Other features can be added to such a device, for example, real time language translation by displaying text in an alternate language from the input language. However, industry and people in general cannot take full advantage of speech recognition because of many problems that exist with the existing technology.

BRIEF SUMMARY OF THE INVENTION

Key Components Needed

Figure 3:
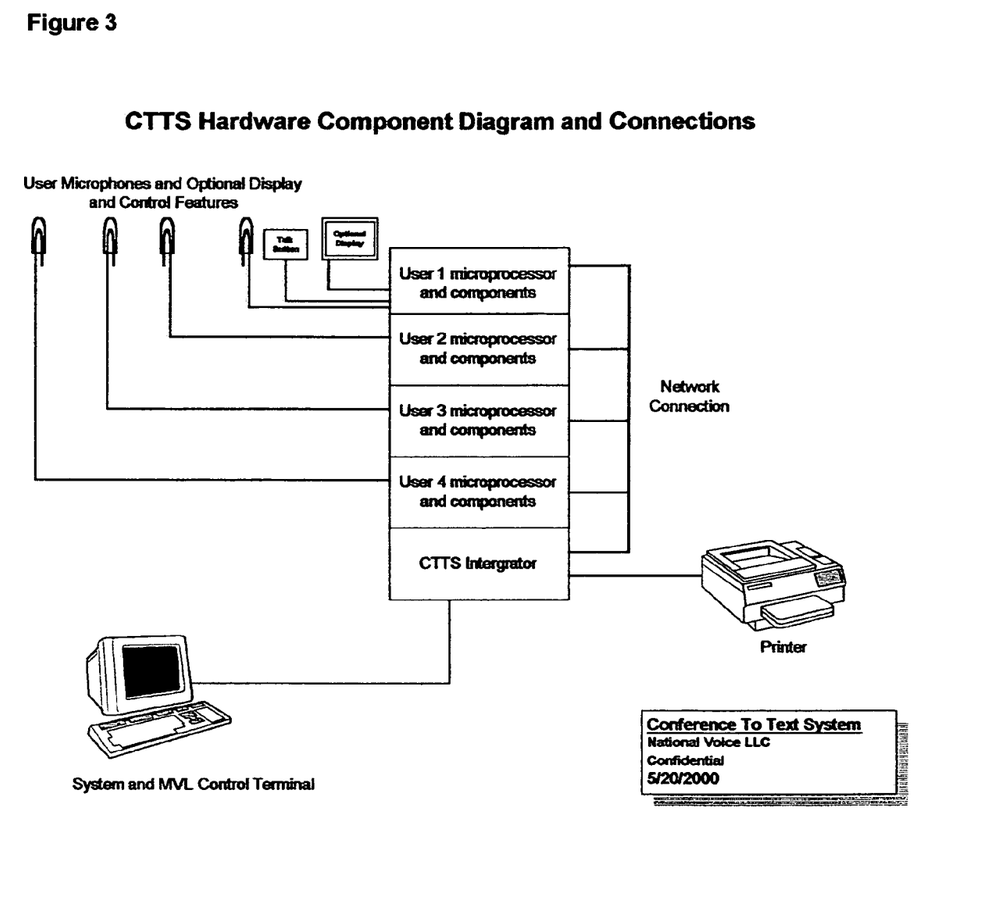
FIG. 3 is a schematic diagram of the hardware component diagram and connections of a conference-to-text system (CTTS) embodying the principles of the present invention.

The following sections will discuss the Conference To Text System (CTTS), which are the hardware and software components that enable the ability to generate a Multi-user Voice Log or MVL. The invention described below addresses the following problems:
Components of the technology that do not exist.
Existing components and technology have not been brought together and debugged to support this aspect of speech recognition.
Training the many systems needed to recognize each person is time consuming and not feasible.
Lack of a command set to control creation of a MVL.
Key components that make up a CTTS include:

1) Computer hardware with high performance that can service a person individually and collaborate in a high performance local area network environment. The hardware needs to have the power and packaging to be customer accepted. A unit containing a high-speed processor, memory, mass storage, audio input, optional display, and mouse would be used for each individual to be captured. A separate computer system 'functioning as a Voice Log Integrator is connected to the user units by a network (FIG. 3). An operating system and speech recognition application is used on each unit. Voice Model Mobility allows users to obviate the need for training.

2) Time Stamp Utility (TSU) is run on the CTTS. The function of the TSU is to apply a time stamp for each group of words spoken between pauses. The TSU is triggered from an interrupt signal to process sound when the sound input frequency range and sound level, and/or sound pressure is within the parameters of the individual speaking versus the person not speaking. This information is stored as part of the voice model and moved into the CTTS using VMM or some similar utility or means.

3) After the individual voice logs are captured, a Voice Time Integrator utility organizes the voice logs into chronological order by time stamp and/or some other indexing method. If identical time stamps are encountered, it is noted on the text log.

4) Options for text output with an index that optionally can be sent to destinations like databases, text transcripts, and audio output.

5) Command interpreter for control and the creation of an MVL. CTTS systems need a user interface for command and control. Control can be done at the individual user level and at the group level. Additionally, other control features can be added in the post processing stage, like specific formats, highlighted areas, other languages displayed, etc.

BRIEF DESCRIPTION OF THE DRAWINGS

The character of the invention, however, may best be understood by reference to one of its structural forms, as illustrated by the accompanying drawings, in which.

DETAILED DESCRIPTION OF THE PREFERRED EMBODIMENT

Invention Descriptions

1) Computer Hardware with High Performance

Computer hardware to support these types of applications must include at least the following components to be effective:

High-speed microprocessors with robust floating point features
Large on chip and/or off chip cache
High-capacity/fast main memory
Quality sound input device with performance focused in the range of the human voice or signal to be translated
An operating system specifically configured (tuned) for the application of speech recognition and data base management.

Figure 4:
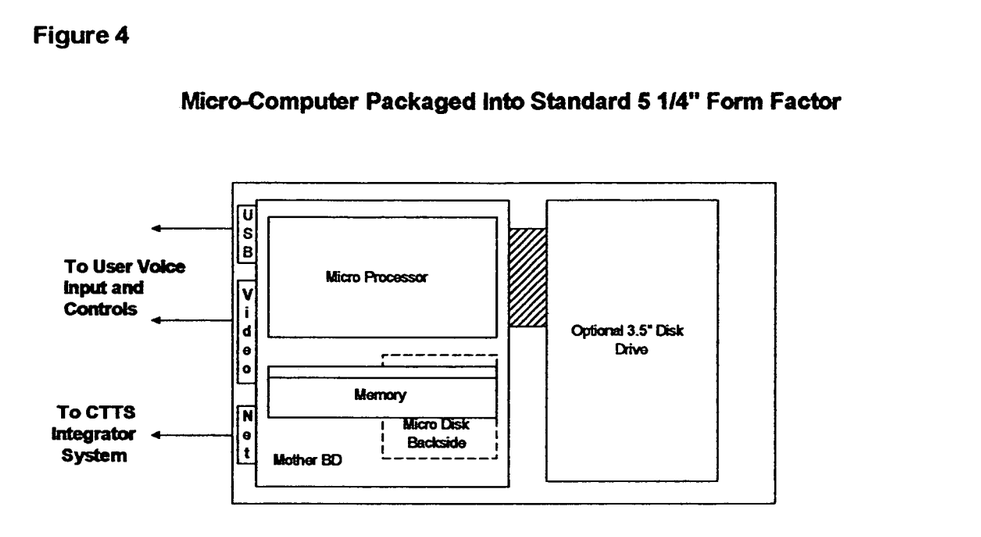
FIG. 4 is a schematic diagram of a micro-computer packaged into a 5¼ inch form factor for a conference-to-text system (CTTS) embodying the principles of the present invention.
Figure 5:
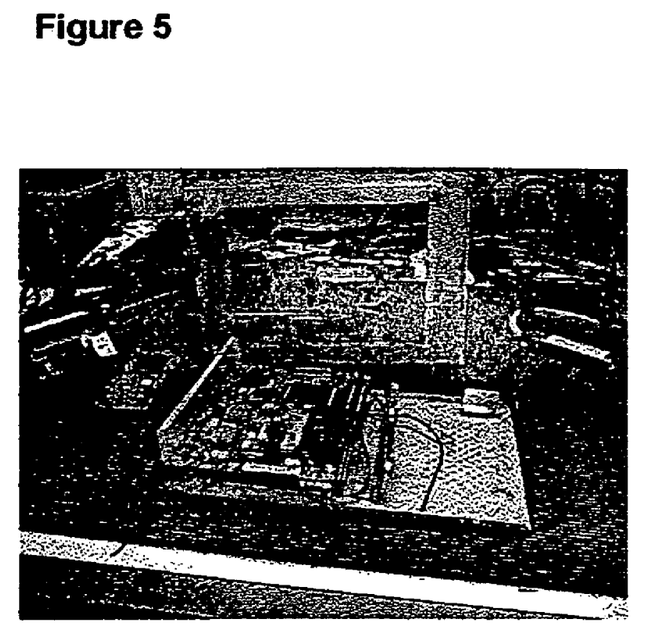
FIG. 5 shows a prototype Micro-Computer packaged in sheet metal enclosure to be mounted in a form factor of standard PC 5¼ inch tower enclosure slot. It is shown opened with components (3.5" disk drive removed). This system has a network port for control and connection to the CTTS integrator. It also has a USB for sound input/output. The system resides away from the user so only the microphone and microphone control is at the user location.
Figure 6:
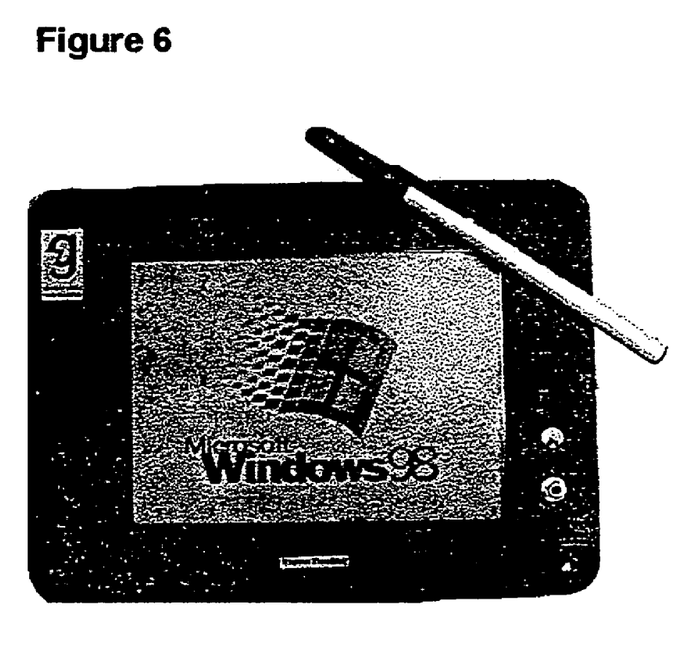
FIG. 6 shows the same internal components as FIG. 5 above, configured as a prototype Micro-Computer for handheld large vocabulary speech recognition packaged in a form factor of standard PC 5½ inch slot. It is shown with the display screen that can be located at a user location in a conference room. Below the pen is the microphone connector and enable switch. It also has a network port for connecting back to the CTTS integrator. It can be used as touch screen, or with a keyboard and/or a mouse.

The hardware in this example is configured in packaging or enclosures that support conference room, hall, and auditorium environments. For example, each user may have a microcomputer located near a small flat screen that displays the text as it's being spoken (FIG. 6). Voice, mouse, and/or touch screen can be used to command the user level device. These miniaturized computers would connect back to a computer which functions as a Voice Log Integrator. The miniaturized computers can also be packaged in standard 5¼" containers that install into a 5¼" computer chassis slots (FIGS. 3 and 4). Although a unique form factor for a computer, this format is common for standard PC peripherals. These 5¼" computers could then integrate the user components, a voice time integrator, and a data base server in one contained box. A General Voice prototype of the 5¼" computer is shown in FIGS. 4 and 5. This device could also be used as a handheld transcriber.

FIG. 6 is the same proto-type unit as FIG. 5, packaged and shown running in a hand held form factor. This prototype supports a vocabulary of over 30,000 words. Results from these prototype models indicate that production models could support vocabularies with hundreds of thousands of words, including such libraries as medical and legal.

2) Voice Time Integrator or Dialog Integrator

Figure 1:
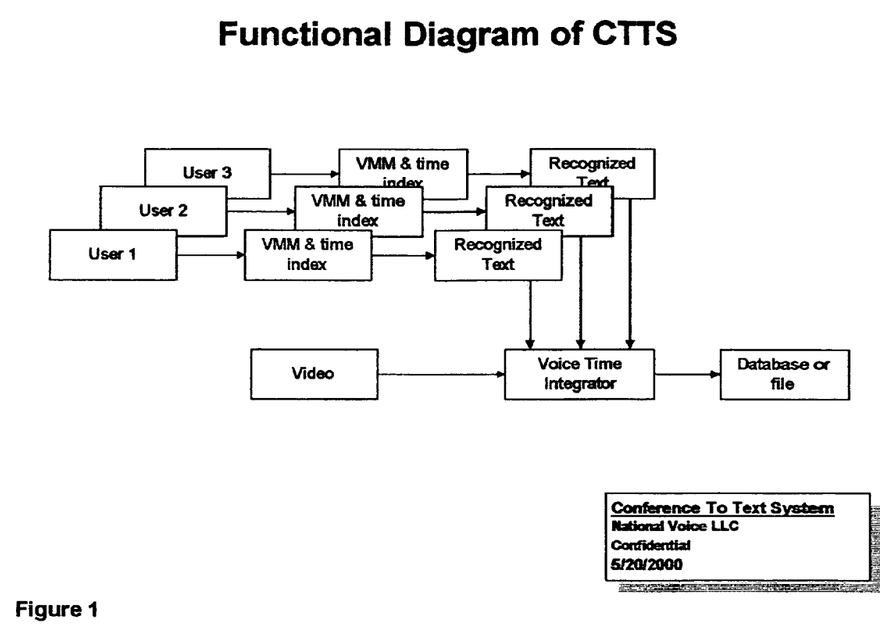
FIG. 1 is a schematic diagram of a conference-to-text system (CTTS) embodying the principles of the present invention.

The Dialog Integrator is software that executes on the CTTS system (See FIG.1). It organizes the captured voice text or voice text logs and puts them in chronological order for screen output or export to a file. In summary, there are three items to be discussed with the Dialog Integrator. These three items include 1) Time stamp, 2) Integrating many voice logs together into a Multi-User Conversation Voice Log, and 3) Taking the voice text and index for each word/sentence and putting that into a database table, text file, or some other file/format. The log file contains a time stamp or some other method to synchronize all voice logs intended for conversion to MVL. The time stamp can be done as an integrator component, or the time stamp may be placed into the log by the speech recognition software or a related utility.

To date there are no speech recognition software packages on the market that include indexing, or time stamping as the words are spoken or after a delay or pause of some amount of time, for example. The integrator could be built into other components like SVM or VMM as well.

3) Index or Time Stamp

Figure 2:
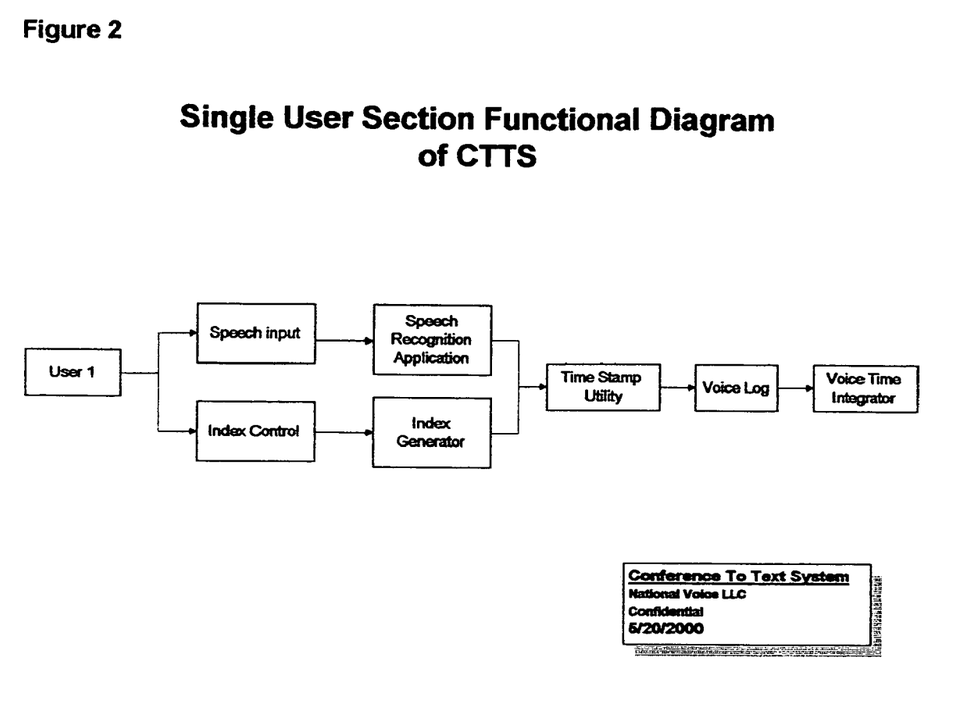
FIG. 2 is a schematic diagram of a single user section of a conference-to-text system (CTTS) embodying the principles of the present invention.

The index or a time stamp is needed for the organization of log files or voice text files to be compiled in the original chronological order that occurred. This index stamp is captured real-time as the events are taking place (FIGS. 1 and 2). A real-time clock or a reference related to a specific event can be used. This index can be generated in many different ways. Here is a list of some of the ways an index can be created and used to allow voice text indexing:

Methods of Enabling:
Button Activated (Press button when speaking, starts index and voice capture)
Voice Activated (Starts index when user is speaking, stops on user stop)
Command Activated (Voice command starts index and voice capture)
Methods of continuously creating index when words are spoken:
Sound level
Sound pressure
Sound frequency
Button Activated
Methods of indexing:
Counter
Clock Text character sequence
Control code sequence 4) Real-time Speech Recognition Captures Software and Components that Maintain a Reliable Level of Accuracy.

A real-time speech recognition software package is needed to capture the voices. There are many speech recognition packages on the market and in the public domain. The speech recognition software must provide a consistent standard level of accuracy. It must also contain a very large vocabulary. The speech recognition engine may be the best place to stamp the time or index because it is closest to the source. Another important feature is a consistent and reliable level of accuracy.

This is essential as the public becomes aware of how to speak to machines that recognize voice. This would allow the public to grow with the technology. The key component that could help this to work would be the use of a "Voice Accuracy Meter".

Voice Accuracy Meter

The voice accuracy meter gives the user the ability to know when the machine will respond with the standard level of accuracy at a given point in time. The voice accuracy meter can work in many different ways. For the purpose of example, I have chosen to use a text compare approach. The text to be used for the accuracy meter could be chosen by the individual user. The user would select any text file and read a section from the text. The voice accuracy meter would then do a comparison, calculation, and feed back the results in real or in past time. It could also highlight and display the words that were incorrect, and provide a percentage or graphic output of final results.

5) Text Output to Destinations like ASCII Text Files or Databases that could allow Random Access to any Word, Sentence, Phrase, etc.

Output of the voice text log file is important for finding any information in the course of the meeting or spoken word. Output to straight ASCII text can be read and searched with an editor. A more powerful way of controlling searching and retrieving is by combining the voice recognition, text output, and index with a database. This allows several new features in searching and retrieving, including time based retrieval, context based retrieval, thread or concept information retrieval, and relational information, to name some of the benefits.

6) Command Interpreter for Controlling and Creating an MVL.

In creating Multi-User Voice Logs, a user-interface and commands are needed. This new command set would address the need of turning the log on, turning the voice-capture log off, playing back logs, referencing, starting new subjects, side conversations, resetting time stamps, and deleting entries that should remain off the record. Additional commands would include a mediator's command set that allow items like "turn on all microphones" to start a meeting.

Key commands for a conference speech recognition system:
Start meeting
Stop meeting
Recognize group
Recognize user
Pause meeting
Print meeting
Print individual "name"
Index method "type"
Strike class comment
Start mute
Stop mute
Start recognize "name"
Stop recognize "name"
Off the record
On the record
Bookmark "phrase"
Mark for correction
List uncorrected
List corrected
Play voice reference
Display user "name"

Applications

Some of the applications that could use this technology include:
Conferences
Phone Calls
Interviews
News capturing
Script capturing
Hallway conversations Enabler of Real-time Data Mining Real-time data mining can be improved using these tools. The tagging of words, phrases, concepts, and users for later reference could be accomplished using the software components as described. This allows references to be inserted while the text is being generated or spoken naturally.

Super Voice Model (SVM)

To explain the concept of the super voice model, I will first talk about the voice model and what that means. A voice model is defined as a signal, information, or electronic data file that is a representation of a person's voice or noise. Therefore any noise that could be captured contains within it a voice model.

Normally, for speech recognition software to support large vocabularies (30,000 plus words), training the software to recognize a person's voice accurately and consistently is ongoing because of ever-changing parameters with regards to the human voice and environment. Therefore, if the hardware and software (machine) that provides recognition is not current with the parameters of the person speaking, there is a delta between the user and the machine. This delta can be the cause of and a measure of inaccuracy. As people use different machines, the delta becomes dynamic and accuracy becomes inconsistent. To allow any user the ability to unplug the "Voice Model" and plug it into the current system in use allows the user the ability to have consistent accuracy. This concept was defined in a previous patent application by Darrell Poirier, and is labeled as Voice Model Mobility (VMM).

Super Voice Models (SVM) is an extension of the voice model. The Super Voice Model, as defined by Darrell Poirier in a previous patent application, is the ability of the machine to recognize many users with a single voice model. There are many ways to achieve a super voice model. For discussion here I will use the following example. Many voice models would be categorized using parameters that can define a group of users that need specific parameters. Then, as a person starts speaking to the machine, the real-time voice would be measured and categorized using the same parameters for that individual person. The real-time parameters would be compared and matched to one of the voice models to be used from the Super Voice Model library.

Another example of creating a Super Voice Model would be to identify and categorize individual sections of many voice models, and access them individually as the persons voice parameters are selected real-time. In other words, many voice models could be set up in something similar to a large table. Similar words, patterns, phrases, and/or other parameters would be kept in adjacent locations in the table. As the person speaks, a thread would move real-time through the table based on the parameters measured real-time from the user. This concept could also be moved directly to hardware, given the availability of the technology needed.

These examples explain in overview how a Super Model could be designed or implemented, the concept being that many people use speech recognition machines with no pre-training.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

What is claimed is:

1. A system for creating and enhancing a transcript of a telephone conversation in a telephone call between two separate persons, the conversation consisting of a series of audio statements each of which is spoken by one of the persons, comprising:

(a) a first telephone receiver adapted to receive a series of audio statements from the first person and convert them into a first analog audio signal, (b) a second telephone receiver adapted to receive a series of audio statements from the second person and convert them into a second analog audio signal, (c) an analog-to-digital converter adapted to convert the first analog audio signal to a first digital audio signal, and the second analog audio signal to a second digital audio signal, (d) a splitter that duplicates the first digital audio signal into two identical digital audio signals, a third digital audio signal and a fourth digital audio signal, respectively, and that duplicates the second digital audio signal into two identical digital audio signals, a fifth digital audio signal and a sixth digital audio signal, respectively, (e) a first divider for dividing the third digital audio signal into audio segments to form a third segmented digital audio signal wherein each audio segment is time indexed, and the audio segments of the third segmented digital audio signal are bounded by two ascertainable events, said events being selected from the group of events comprising when one of the persons makes a telephone call, when a second person answers the phone call, when a person starts or stops speaking during the telephone call, when a second person speaks while the first person is speaking (considered as three separate events) during the telephone call, when audio volume of one of the audio signals increases (either mechanically or by a person raising the loudness of their voice), when audio volume of one of the audio signals decreases, when a button on a phone keypad is pressed, when a phone line is muted or unmuted, when a collect call is accepted, when a specific word or phrase is spoken, when a playback of an automatic recorded message occurs, when a phone number is verified, and when actions are taken based on a recorded message, (f) a second divider for dividing the fifth digital audio signal into audio segments to form a fifth segmented digital audio signal, wherein each audio segment is time indexed, and the audio segments of the fifth segmented digital audio signal are bounded by two ascertainable events, said events being selected from the group of events comprising when one of the persons makes a telephone call, when a second person answers the phone call, when a person starts or stops speaking during the telephone call, when a second person speaks while the first person is speaking (considered as three separate events) during the telephone call, when audio volume of one of the audio signals increases (either mechanically or by a person raising the loudness of their voice), when audio volume of one of the audio signals decreases, when a button on a phone keypad is pressed, when a phone line is muted or unmuted, when a collect call is accepted, when a specific word or phrase is spoken, when a playback of an automatic recorded message occurs, when a phone number is verified, and when actions are taken based on a recorded message, (g) a first audio storage device adapted to store the third segmented digital audio signal, (h) a second audio storage device adapted to store the fifth segmented digital audio signal, (i) a first audio-to-text converter adapted to transcribe the fourth digital audio signal to a first raw transcript of the conversation, the first raw transcript including a plurality of text words, each text word in the fourth digital audio signal being indexed to the audio segment in the third segmented audio signal to which it relates, (j) a first text storage device adapted to store the first raw transcript produced by the first audio-to-text converter, (k) a first text-to-audio associator adapted to associate each text word in the first raw transcript directly with the audio segment from which the text word was transcribed, (l) a viewer adapted to display the text located in the first text storage device, in the form of the first raw transcript of the conversation, (m) a highlighter associated with the viewer and adapted to specify a first specific text word in the first raw transcript displayed in the viewer, (n) an audio player associated with the viewer and adapted to employ the text-to-audio associator to audibility play back the audio segment associated with the first specific text word, (o) a manual editor associated with the viewer and adapted to correct the first specific text word, based on the use of the audio player, to enhance the first raw transcript to a first enhanced transcript, and (p) a second text storage device adapted to store the first enhanced transcript produced by the manual editor.

2. A method for creating and enhancing a transcript of a telephone conversation in a telephone call between two separate persons, the conversation consisting of a series of audio statements each of which is spoken by one of the persons, comprising:

(a) using a first telephone receiver to receive a series of audio statements from the first person and convert them into a first analog audio signal, (b) using a second telephone receiver to receive a series of audio statements from the second person and convert them into a second analog audio signal, (c) using an analog-to-digital converter to convert the first analog audio signal to a first digital audio signal, and the second analog audio signal to a second digital audio signal, (d) using a splitter to duplicate the first digital audio signal into two identical digital audio signals, a third digital audio signal and a fourth digital audio signal, respectively, and to duplicate the second digital audio signal into two identical digital audio signals, a fifth digital audio signal and a sixth digital audio signal, respectively, (e) using a first divider to divide the third digital audio signal into audio segments to form a third segmented digital audio signal wherein each audio segment is time indexed, and the audio segments of the third segmented digital audio signal are bounded by two ascertainable events, said events being selected from the group of events comprising when one of the persons makes a telephone call, when a second person answers the phone call, when a person starts or stops speaking during the telephone call, when a second person speaks while the first person is speaking (considered as three separate events) during the telephone call, when audio volume of one of the audio signals increases (either mechanically or by a person raising the loudness of their voice), when audio volume of one of the audio signals decreases, when a button on a phone keypad is pressed, when a phone line is muted or unmuted, when a collect call is accepted, when a specific word or phrase is spoken, when a playback of an automatic recorded message occurs, when a phone number is verified, and when actions are taken based on a recorded message, (f) using a second divider to divide the fifth digital audio signal into audio segments to form a fifth segmented digital audio signal, wherein each audio segment is time indexed, and the audio segments of the fifth segmented digital audio signal are bounded by two ascertainable events, said events being selected from the group of events comprising when one of the persons makes a telephone call, when a second person answers the phone call, when a person starts or stops speaking during the telephone call, when a second person speaks while the first person is speaking (considered as three separate events) during the telephone call, when audio volume of one of the audio signals increases (either mechanically or by a person raising the loudness of their voice), when audio volume of one of the audio signals decreases, when a button on a phone keypad is pressed, when a phone line is muted or unmuted, when a collect call is accepted, when a specific word or phrase is spoken, when a playback of an automatic recorded message occurs, when a phone number is verified, and when actions are taken based on a recorded message, (g) using a first audio storage device to store the third segmented digital audio signal, (h) using a second audio storage device to store the fifth segmented digital audio signal, (i) using a first audio-to-text converter to transcribe the fourth digital audio signal to a first raw transcript of the conversation, the first raw transcript including a plurality of text words, each text word in the fourth digital audio signal being indexed to the audio segment in the third segmented audio signal to which it relates, (j) using a first text storage device to store the first raw transcript produced by the first audio-to-text converter, (k) using a first text-to-audio associator to associate each text word in the first raw transcript directly with the audio segment from which the text word was transcribed, (l) using a viewer to display the text located in the first text storage device, in the form of the first raw transcript of the conversation, (m) using a highlighter associated with the viewer to specify a first specific text word in the first raw transcript displayed in the viewer, (n) using an audio player associated with the viewer to employ the text-to-audio associator to audibility play back the audio segment associated with the first specific text word, (o) using a manual editor associated with the viewer to correct the first specific text word, based on the use of the audio player, to enhance the first raw transcript to a first enhanced transcript, and (p) using a second text storage device to store the first enhanced transcript produced by the manual editor.

\* \* \* \* \*